United States Patent Office 2,915,463
Patented Dec. 1, 1959

2,915,463

METHOD OF TREATING WATER

Edward R. Williams, Pittsburgh, Pa., assignor of one-half to Ella E. Williams, Pittsburgh, Pa.

No Drawing. Application June 6, 1958
Serial No. 740,200

3 Claims. (Cl. 210—59)

This invention relates to new and useful methods for the treatment of water.

My United States patents, Nos. 2,306,147 and 2,543,-562, issued December 22, 1942, and February 27, 1951, respectively, disclosed methods and compositions for treating water that are of outstanding usefulness. Upon practicing those inventions for the treatment of water, the amount of free halogen bactericide that must be added to water to maintain proper bacteria control is reduced, the treated water is provided with algaecidic characteristics and is softened, and its solvency power is increased for such contaminants as body greases, rouge, lipstick and the like.

Water treatment in accordance with my above-mentioned patents has been practiced commercially on a very large scale. Those inventions have been in daily use in laundries and in treating waters for public and private swimming pools for years. Thus, the principles upon which those inventions are based have proven sound through their successful use in application by the treatment of millions of gallons of water for extended periods of time under a wide variety of conditions.

I have now discovered, after extended study and experimentation, that water-treating in accordance with the basic teachings of my previous inventions can be improved. More particularly, I have found that by the addition of sodium xylene sulfonate to the sulfate-sulfonate-silicate compositions that I have heretofore used, there results a composition having a greater concentration of algaecidic constituents along with a greater solvency, or anti-coagulating effect, on the contaminants introduced into water from the human body. Consequently, upon treating water in accordance with my present invention, the maintenance of bacteria control with a given quantity of the treating composition can be accomplished and the cycle of active equipment maintenance, such as filter and conduit cleaning, can be extended at least as long as previous periods while obtaining equally satisfactory characteristics in the treated water.

In practicing this invention, the compositions to be added to the water consist essentially of sodium silicate, a neutral petroleum sulfonate, sodium sulfate, and sodium xylene sulfonate. The petroleum sulfonates that are used are commercially available products. They are water soluble and substantially neutral. These sulfonates conform to the general formula R—SO₃—Na where R is a hydrocarbon radical containing about 16 carbon atoms, such as decyl benzene. A typical sulfonate is sodium decyl benzene sulfonate. The sulfonates as sold commercially can be used in the invention and are generally obtained as a solution containing about 30 to 40 percent solids and the remaining 60 to 70 percent water.

The sodium sulfate usually and preferably is provided as a component of the commercial petroleum sulfonates. Petroleum sulfonate is available containing 60 weight percent of water, 34 weight percent of petroleum sulfonate and 6 weight percent of sodium sulfate. On a solids basis, 85 percent is the sulfonate and the remaining 15 percent is the sulfate. Other commercial sulfonates with a sulfate content, on a solids basis, of as low as 1½ percent and as high as about 16 percent also may be used if desired or convenient. The sulfonate-sulfate mixtures are prepared by well-known techniques which generally involve a sulfuric acid treatment of a suitable petroleum fraction followed by treatment to neutralize the sulfonic acids, as by use of sodium hydroxide or other base.

Sodium silicate, an alkali, also is included in the compositions. While extended study of the action of the respective components shows that the silicate cooperates with the petroleum sulfonate to cause results that cannot be attributed to either component alone, one of its primary functions is to aid in providing the desired pH (usually 7.2 to 7.6) of the water after treatment. The cooperative action of the component of the compositions is manifest from the fact that use of the invention neither precipitates the alkaline earth metal or other hardening agents dissolved in water, nor causes the liberation of carbon dioxide due to decomposition of such salts when the water is treated, thereby demonstrating that the sulfonate acts to repress this normal action of the alkali. The sodium silicate can be added in liquid or semi-liquid form, both of which are articles of commerce. Sodium silicate preferably is used as a highly concentrated solution that is quite viscous and has a specific gravity of about 50° Bé. at 60° F. and which weighs about 12 pounds per gallon. To facilitate mixing with the other constituents, water is added to reduce the viscosity and bring the gravity to about that of the other constituents. The solution is then mixed thoroughly to produce the finished composition. The mixture is allowed to stand undisturbed until the impurities precipitate to the bottom of the mixing tank and then the supernatant liquid is withdrawn and may be used without further treatment.

The petroleum sulfonate, sodium sulfate and sodium silicate are present in the compositions of my above-mentioned patents and in the present invention in the same general proportions. In the present invention an additional component, sodium xylene sulfonate, is included. As with the other components, the sodium xylene sulfonate is available commercially. Such solutions have a pH at 25° C. of 7.5 to 8.5 and a specific gravity on the order of 1.17. Other sodium xylene sulfonates can be used if desired.

The sodium xylene sulfonates are completely compatible with the basic constituents of the compositions used in this invention, a fact developed and shown by extensive experimentation. Surprisingly, the addition of the sodium xylene sulfonate constituent to the primary composition exerts an action toward the halogen bactericidic reagents used in the treatment of water for bacteria control, such as chlorine, bromine, etc., whereby less of such bactericides are required to maintain adequate bacteria control.

Another advantage resulting upon the addition of the sodium xylene sulfonate to the primary composition is that it exerts a purifying effect upon the finished composition. This is demonstrated in preparing the compositions by the dissociation and precipitation of constituents believed to be impurities that occur or are formed upon manufacturing the commercial constituents of the composition, such as the petroleum sulfonate. The precipitate promptly settles in such manner that the supernatant liquid, which is the finished composition to be used in the invention, can readily be separated by decanting or pumping and no mechanical filtering process is required. As is apparent, the removal of those inactive impurities, i.e. the precipitate, materially reduces the weight and viscosity of a batch of the resulting composition without in any manner deleteriously affecting the softening, anticoagulating and algaecidal characteristics of the resulting compositions. Indeed, even ignoring the qualitative improvement in these desirable characteristics, it is apparent that an improved composition has resulted because at least the same level of activity is achieved with a lower viscosity and lesser weight of material since the impurities have been removed.

Representative compositions that are used in accordance with my invention are prepared as follows: An aqueous solution of the petroleum sulfonate is placed in a mixing tank. Generally this solution contains, on a weight basis, 34 percent of the petroleum sulfonate, 6 percent of sodium sulfate and 60 percent water. The percentages, on a solids basis, are 85 percent sulfonate and 15 percent sulfate. Other solutions, such as those having about 30 percent solids, also can be used. For each ten parts by weight of the foregoing aqueous petroleum sulfonate mixture, I add 20 to 25 parts by weight of an aqueous solution of sodium silicate having a specific gravity of about 50° Bé. at 60° F. and which weighs about 12 pounds per gallon. Based on the solids it is seen that silicate in an amount substantially equal to 2 to 2½ times that of the combined sulfonate-sulfate solids is used. To that mixture and based on the petroleum sulfonate solution there is then added 1.75 to 2.25 parts by weight of a sodium xylene sulfonate solution that contains about 40 percent by weight of the xylene sulfonate and the balance water. Converting this to a solids basis it will be observed that about 1 part of the xylene sulfonate is used for each 4 to 6 parts of the petroleum sulfonate-sulfate mixture. The foregoing mixture is then permitted to stand until the resulting precipitant collects at the bottom of the tank and then the supernatant liquid is withdrawn.

It has been noted above that one of the outstanding advantages of this invention is in the fact that proper bacteria control can be secured, upon using this invention, with a lower quantity of, for example, chlorine than heretofore. For example, in one swimming pool normally treated with sufficient chlorine to provide 0.5 part per million parts of water, as shown by an ortho tolidine indicator, the pool operator was advised to reduce the amount of halogen bactericide by 40 percent. Hence it would be expected that but 0.3 part of chlorine per million of water would be present. Upon adding the composition of the invention to the chlorinated water and testing with the indicator, it is shown that the actual concentration of chlorne is 0.5 p.p.m. While the invention is not to be limited by theory, it is believed that the foregoing result occurs as a consequence of the composition of this invention tending to maintain the chlorine soluble, detectable and in form free to act as a bactericide. Accordingly, substantially all the chlorine added is utilized. Since very little of the chlorine becomes tied-up in inactive forms, it is apparent that the use of the composition of this invention permits a costs savings with regard to the bactericide which must be used.

While the savings in the amount of chlorine that must be used is significant, other advantages result as a consequence thereof. A lower bactericidal content will improve water odor and taste, and will reduce the eye irritation that attends the use of chlorine and the like in waters.

In treating water in accordance with this invention, the quantity and analysis of the composition to be used depends upon the ultimate use of the treated water. For example, if municipal water supplies are to be treated, it is desirable to avoid excess frothing or sudsing action in the treated water. Accordingly, the alkali constituents present may be reduced. For treatment of water for laundering purposes, a maximum sudsing action is required and hence a maximum amount of all constituents is used. For the treatment of swimming pool waters and the like, high solvency for the usual contaminants therein and a high degree of algaecidic properties is desired. However, it is preferred that these actions result without excessive sudsing. Consequently, it is usual to maximize the sulfonates and sulfate while minimizing or reducing the relative quantity of alkali. In preparing compositions for the various applications, I have found that generally the only change required is an adjustment of the ratio of the petroleum sulfonate to the sodium sulfate present. Consequently, the relative quantities of sodium silicate and sodium xylene sulfonate can be maintained the same.

No specific method of applying the composition to water need be used and the composition may be added thereto in any manner that is convenient. Simply pouring it into a swimming pool will accomplish the desired results. The composition is also adapted for feeding to any water line mechanically, whereupon it soon permeates the entire body of water particularly in view of its solubility. In swimming pools, since the water is constantly circulated during operation of the pools, it is apparent that the filters and lines will be kept clear since the compositions can exert their action there also.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim as my invention:

1. The method of treating water which comprises adding thereto an aqueous solution containing sodium sil'cate in sufficient quantities to impart alkalinity, a neutral petroleum sulfonate composed of 84 to 98.5 percent of petroleum sulfonate and 1.5 to 16 percent of sodium sulfate, and sodium xylene sulfonate in an amount of about one part for each four to six parts of said neutral petroleum sulfonate present, said petroleum sulfonate conforming to the formula R—SO$_3$—Na where R is a hydrocarbon radical containing about 16 carbon atoms.

2. The method of treating water wherein a residual remains, from the treatment thereof with a free halogen bactericide selected from the group consisting of chlorine and bromine to maintain a low bacteria count, which comprises adding thereto the following mixture: an aqueous solution containing sodium silicate in an amount sufficient to impart alkalinity to the resulting treated water, a neutral petroleum sulfonate composed of 84 to 98.5 percent of petroleum sulfonate and 1.5 to 16 percent of sodium sulfate, and sodium xylene sulfonate, said silicate being present in an amount substantially equal to 2 to 2½ the sum total of the petroleum sulfonate and sodium sulfate mixture, said petroleum sulfonate having the formula R—SO$_3$—Na where R is a hydrocarbon radical containing about 16 carbon atoms.

3. The method of treating swimming pool water wherein a residual remains, from the treatment thereof with a free halogen bactericide selected from the group consisting of chlorine and bromine to maintain a low bacteria count, to increase the effective halogen content of said water which comprises adding to said water an aqueous solution prepared as follows: mixing 20 to 25 parts of an aqueous solution of sodium silicate with 10 parts by weight of an aqueous solution containing 30 weight percent total of a neutral petroleum sulfonate and sodium sulfate where said sulfate is present in a minor amount, and 1.75 to 2.25 parts by weight of about a 40 percent aqueous solution of sodium xylene sulfonate, and separating the resulting aqueous solution from a precipitate that forms, said petroleum sulfonate having the formula R—SO$_3$—Na where R is a hydrocarbon radical containing about 16 carbon atoms.

References Cited in the file of this patent

UNITED STATES PATENTS

| | | |
|---|---|---|
| 2,543,562 | Williams | Feb. 27, 1951 |
| 2,581,677 | Machlis | Jan. 8, 1952 |
| 2,634,240 | Showalter | Apr. 7, 1953 |